(12) United States Patent
Zhang

(10) Patent No.: US 10,511,206 B2
(45) Date of Patent: Dec. 17, 2019

(54) CEILING FAN

(71) Applicant: FOSHAN CARRO ELECTRICAL CO., LTD., Foshan (CN)

(72) Inventor: Jiansheng Zhang, Foshan (CN)

(73) Assignee: FOSHAN CARRO ELECTRICAL CO., LTD., Foshan (CN)

( * ) Notice: Subject to any disclaimer, the term of this patent is extended or adjusted under 35 U.S.C. 154(b) by 126 days.

(21) Appl. No.: 15/939,337

(22) Filed: Mar. 29, 2018

(65) Prior Publication Data

US 2018/0219451 A1 Aug. 2, 2018

Related U.S. Application Data

(63) Continuation-in-part of application No. PCT/CN2016/100398, filed on Sep. 27, 2016.

(30) Foreign Application Priority Data

Sep. 29, 2015 (CN) .................... 2015 2 0769037 U

(51) Int. Cl.
| | |
|---|---|
| *H02K 5/16* | (2006.01) |
| *H02K 7/00* | (2006.01) |
| *F04D 25/06* | (2006.01) |
| *F04D 25/08* | (2006.01) |
| *F04D 29/34* | (2006.01) |
| *H02K 1/14* | (2006.01) |

(Continued)

(52) U.S. Cl.
CPC .......... *H02K 7/003* (2013.01); *F04D 25/062* (2013.01); *F04D 25/064* (2013.01); *F04D 25/0646* (2013.01); *F04D 25/088* (2013.01); *F04D 29/34* (2013.01); *H02K 1/14* (2013.01); *H02K 1/2786* (2013.01); *H02K 5/16* (2013.01); *H02K 7/14* (2013.01)

(58) Field of Classification Search
CPC .......... H02K 5/173; H02K 7/003; H02K 7/14; H02K 1/14; H02K 1/2786; H02K 5/16; F04D 25/062; F04D 25/064; F04D 25/0646; F04D 25/088; F04D 29/34
USPC .................... 310/425, 420, 90–91
See application file for complete search history.

(56) References Cited

U.S. PATENT DOCUMENTS

| | | | |
|---|---|---|---|
| 5,338,992 A * | 8/1994 | Tsai ...................... | H02K 3/50 310/71 |
| 5,883,449 A * | 3/1999 | Mehta ................. | F04D 25/082 310/417 |

(Continued)

*Primary Examiner* — Thanh Lam
(74) *Attorney, Agent, or Firm* — Matthias Scholl P.C.; Matthias Scholl

(57) ABSTRACT

A ceiling fan, including: a rotary shaft, a stator, and a rotor. The rotor includes an inner annular chamber, a magnetic-shoe fixation portion, a connection portion, and a bearing installation portion. The stator is housed in the inner annular chamber of the rotor. The bearing installation portion is disposed at one side of the magnetic-shoe fixation portion. One end of the connection portion is fixed on the magnetic-shoe fixation portion, and the other end of connection portion is fixed on the bearing installation portion. The magnetic-shoe fixation portion, the bearing installation portion are integrated with the connection portion. The geometric centers of the rotary shaft, the stator, the magnetic-shoe fixation portion, and the bearing installation portion are located in a straight line.

11 Claims, 6 Drawing Sheets

(51) Int. Cl.
*H02K 1/27* (2006.01)
*H02K 7/14* (2006.01)

(56) References Cited

U.S. PATENT DOCUMENTS

| | | | | |
|---|---|---|---|---|
| 6,638,019 B2 * | 10/2003 | Mehta | ................... | F04D 25/088 310/157 |
| 2003/0218396 A1 * | 11/2003 | Hsieh | ................... | F04D 25/088 310/89 |
| 2015/0176588 A1 * | 6/2015 | Yin | ....................... | F04D 25/088 310/90 |
| 2015/0333592 A1 * | 11/2015 | Yin | ........................ | H02K 5/165 310/51 |

* cited by examiner

CEILING FAN

CROSS-REFERENCE TO RELAYED APPLICATIONS

This application is a continuation-in-part of International Patent Application No. PCT/CN2016/100398 with an international filing date of Sep. 27, 2016, designating the United States, now pending, and further claims foreign priority benefits to Chinese Patent Application No. 201520769037.0 filed Sep. 29, 2015. The contents of all of the aforementioned applications, including any intervening amendments thereto, are incorporated herein by reference. Inquiries from the public to applicants or assignees concerning this document or the related applications should be directed to: Matthias Scholl PC., Attn.: Dr. Matthias Scholl Esq., 245 First Street, 18th Floor, Cambridge, Mass. 02142.

BACKGROUND OF THE INVENTION

Field of the Invention

The disclosure relates to a ceiling fan.

Description of the Related Art

Typically, the motor housing of the DC ceiling fans includes an upper housing and a lower housing. The blades are disposed on the upper or lower housing, and the bearings are installed in the center of the upper housing and the lower housing. The coaxiality of the upper housing and the lower housing is an important index to ensure the stable operation of the ceiling fans. Conventionally, the coaxiality of the upper housing and the lower housing is repeatedly adjusted and measured by using special precision instrument, which involves a complex inspection process, thus increasing the production costs and reducing the production efficiency.

In addition, the blades are installed on the upper housing or lower housing of the ceiling fan, which means the motor not only drives the blades, but also drives the upper housing and the lower housing to rotate, leading to the waste of electric power. Furthermore, the rotating upper housing or lower housing adversely affects the function extension of the ceiling fan, for example, lighting arrangement.

SUMMARY OF THE INVENTION

In view of the above-described problems, it is one objective of the invention to provide a ceiling fan that features accurate coaxiality of the rotor, the stator, and the rotary shaft.

To achieve the above objective, in accordance with one embodiment of the invention, there is provided a ceiling fan comprising a rotary shaft, a stator, and a rotor. The rotor comprises an inner annular chamber, a magnetic-shoe fixation portion, a connection portion, and a bearing installation portion. The stator is housed in the inner annular chamber of the rotor; the bearing installation portion is disposed at one side of the magnetic-shoe fixation portion; one end of the connection portion is fixed on the magnetic-shoe fixation portion, the other end of connection portion is fixed on the bearing installation portion, and the magnetic-shoe fixation portion, the bearing installation portion are integrated with the connection portion; and geometric centers of the rotary shaft, the stator, the magnetic-shoe fixation portion, and the bearing installation portion are located in a straight line.

In a class of this embodiment, the connection portion employs an L-shaped stiffening rib which comprises a first end fixed on the magnetic-shoe fixation portion and a second end fixed on the bearing installation portion.

In a class of this embodiment, a first stiffening rib is provided at a joint of the L-shaped stiffening rib and the bearing installation portion; the first stiffening rib comprises a first side fixed on the bearing installation portion and a second side fixed on the L-shaped stiffening rib; the L-shaped stiffening rib comprises a first leg and a second leg, a second stiffening rib is provided at a joint of the first leg and the second leg, and the second stiffening rib comprises two sides which are fixed on the first leg and the second leg of the L-shaped stiffening rib, respectively.

In a class of this embodiment, the magnetic-shoe fixation portion comprises a plurality of blade installation portions that are distributed regularly around the magnetic-shoe fixation portion in a radial pattern; and the bearing installation portion and the blade installation portion are integrated with the magnetic-shoe fixation portion.

In a class of this embodiment, the plurality of blade installation portions comprises a cavity, and a plurality of threaded installation posts are disposed in the cavity.

In a class of this embodiment, two or more bearings are disposed in the bearing installation portion.

In a class of this embodiment, the bearing installation portion comprises a stepped installation chamber for accommodating bearings with various inner diameters.

In a class of this embodiment, the stator comprises a main body, stator teeth, windings, and a plurality of arc members; the stator teeth are distributed regularly at an edge of the main body in a radial pattern; and the windings are wrapped around the stator teeth.

In a class of this embodiment, the plurality of arc members is regularly and vertically disposed on an end face of the main body.

In a class of this embodiment, an outer side wall of the rotary shaft is sunken to form an inner groove, and a locating ring is disposed in the inner groove; the locating ring cooperates with the inner groove to fix the rotary shaft in the stator and the bearing installation portion.

In a class of this embodiment, the outer side wall of the rotary shaft comprises a first inner groove and a second inner groove; the first inner groove is located below an end face of the stator, and the second inner groove is located below an end face of the bearing installation portion.

Advantages of the ceiling fan provided by the disclosure are summarized as follows. The magnetic-shoe fixation portion is integrated with the bearing installation portion through injection molding or metal die-casting; the bearing installation portion is disposed on one side of the rotation plane of the magnetic-shoe fixation portion, thus ensuring the accurate coaxiality therebetween. During installation, the bearings are installed in bearing installation portion, and then the rotary shaft on which the stator is fixed passes through the inner annular chamber of the magnetic-shoe fixation portion and then through the bearing installation portion, in such a manner that the geometric centers of the rotary shaft, the stator, the magnetic-shoe fixation portion, and the bearing installation portion are located in a straight line. As such, the installation is convenient. The coaxiality between the magnetic-shoe fixation portion and the bearing installation portion and the respective symmetry thereof are ensured through adjusting the injection or casting process parameters in a mold. The assembly of the ceiling fan is simple, efficient, and the ceiling fan features high coaxiality.

Figure 1:
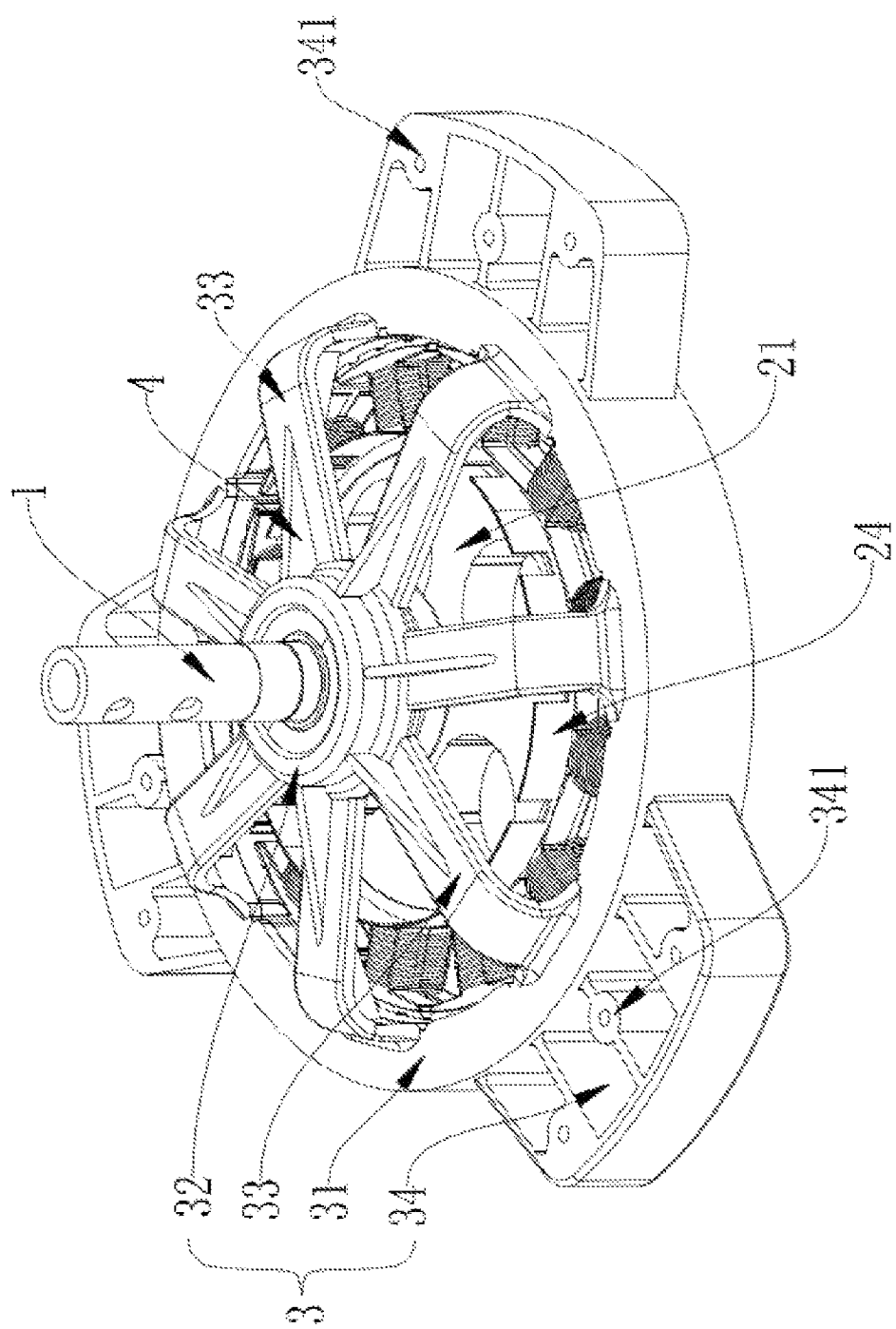
FIG. 1 is a schematic structural view of a ceiling fan according to an embodiment of the disclosure.

In the drawings, the following reference numbers are used: 1. Rotary shaft; 101. Inner groove; 2. Stator; 21. Main body; 22. Stator tooth; 23. Winding; 24. Arc member; 3. rotor; 31. Magnetic-shoe fixation portion; 310. Inner annular chamber; 311. Locating installation slot; 32. Bearing installation portion; 33. Connection portion; 34. Blade installation portion; 341. Installation post; 4. First stiffening rib; 5. Second stiffening rib; 6. Magnetic shoe; 7. Locating ring; 71. Locating block; 8. Bearing.

DETAILED DESCRIPTION OF THE EMBODIMENTS

For further illustrating the invention, experiments detailing a ceiling fan are described below. It should be noted that the following examples are intended to describe and not to limit the invention.

Figure 2:
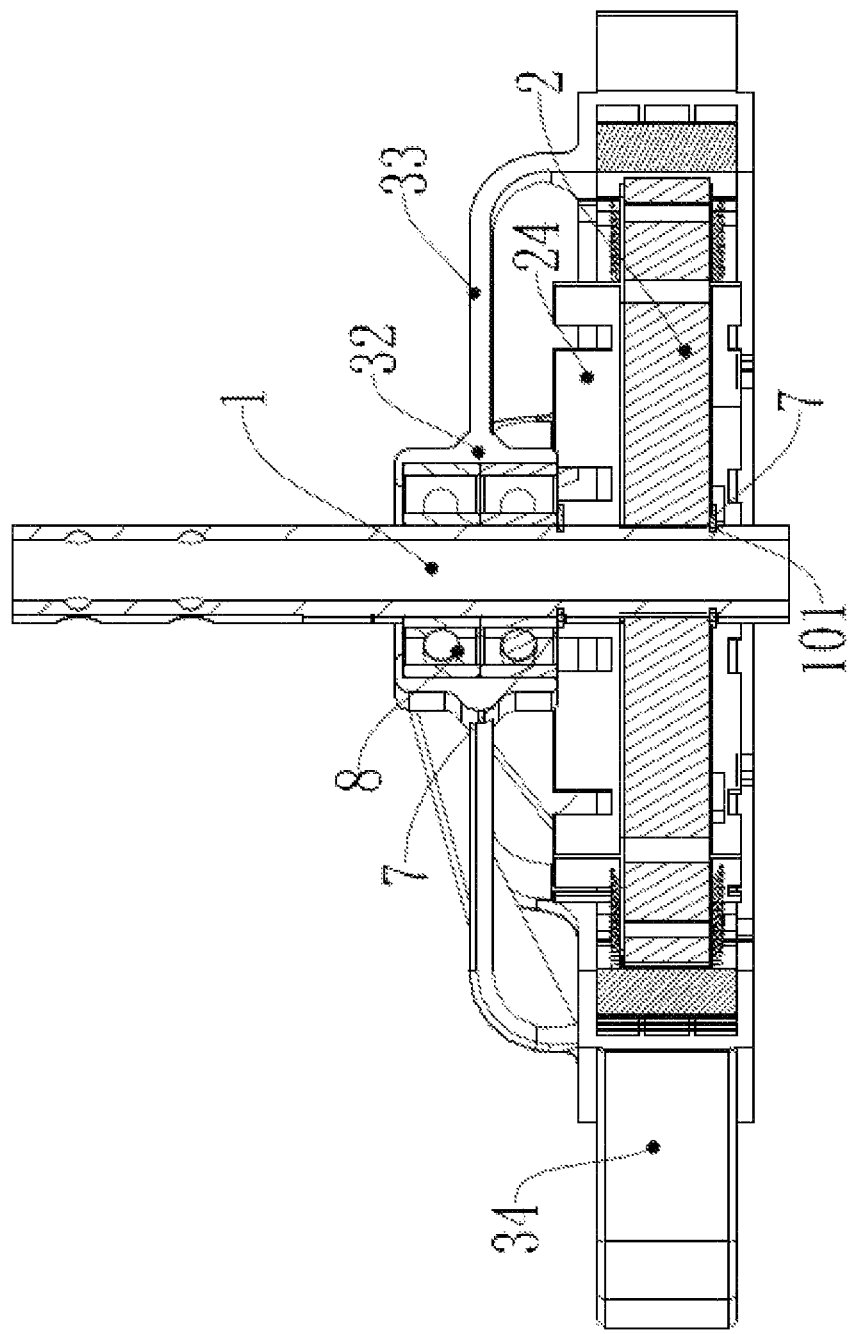
FIG. 2 is a vertical sectional view of a ceiling fan according to an embodiment of the disclosure.

As shown in FIGS. 1 and 2, a ceiling fan comprises a rotary shaft 1, a stator 2, and a rotor 3. The stator 2 is housed in an inner annular chamber 310 of the rotor 3. The rotor 3 comprises a magnetic-shoe fixation portion 31 and a bearing installation portion 32. The magnetic-shoe fixation portion 31 is integrated with the bearing installation portion 32. The bearing installation portion 32 is provided on only one side of the rotation plane of the magnetic-shoe fixation portion 31. The geometric centers of the rotary shaft 1, the stator 2, the magnetic-shoe fixation portion 31, and the bearing installation portion 32 are located in a straight line.

In the motor, the stator windings of the motor are connected in the form of symmetrical three-phase star. A magnetized permanent magnet is fixed on the rotor of the motor. A driver enables the windings of various phases in the stator armature to constantly change phases while being energized, so that the magnetic field of the stator changes constantly with the position of the rotor to maintain a space angle between the magnetic field of the stator and the permanent magnetic field of the rotor in the left-right direction, so as to generate a torque to drive the rotor into rotation, converting electric energy into mechanical energy. Therefore, in order to ensure stable rotation of the rotor, extremely high coaxiality must be achieved between the stator and rotor when they are connected to each other via the rotary shaft.

Figure 4:
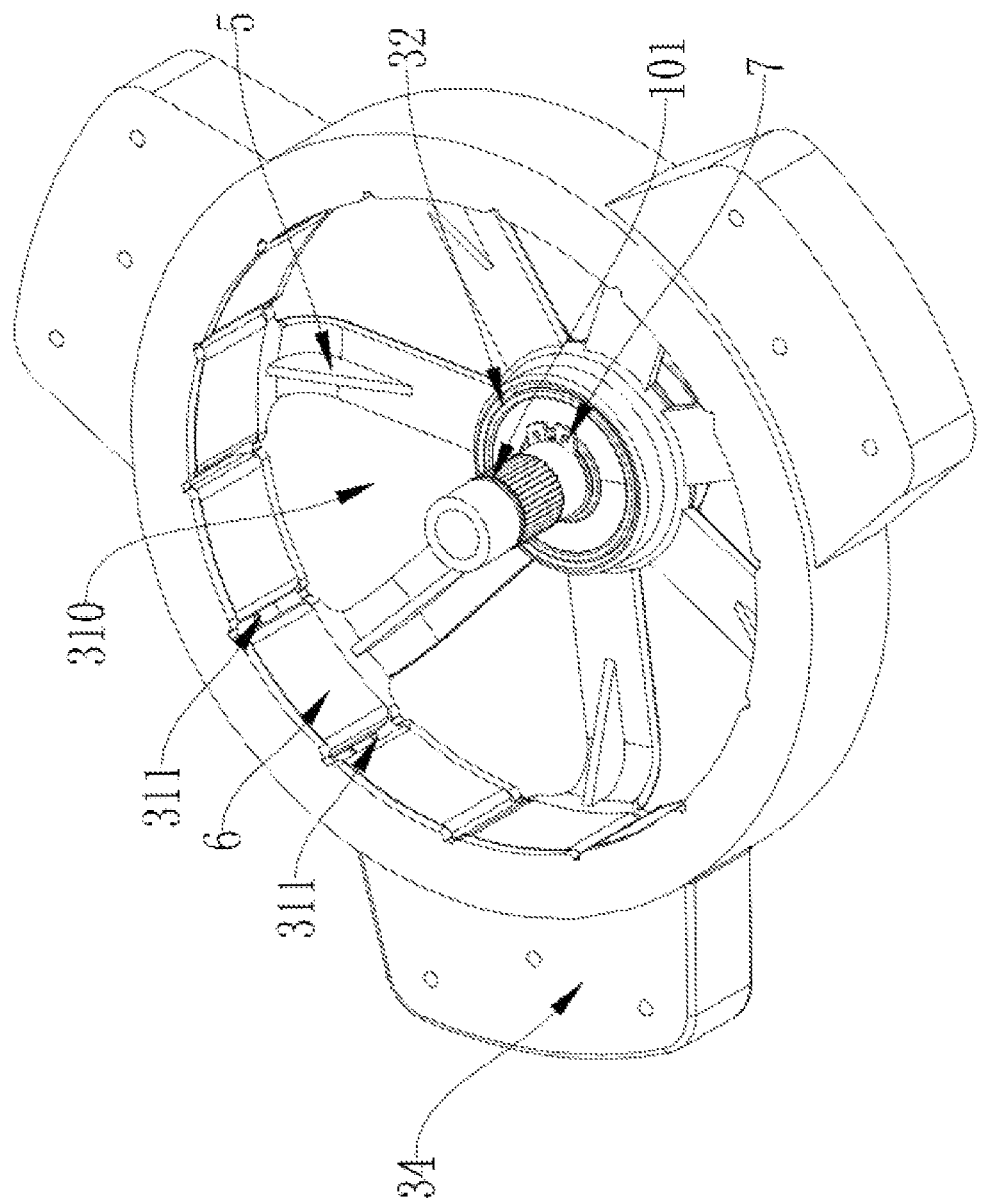
FIG. 4 is a schematic structural view of a rotor of a ceiling fan according to an embodiment of the disclosure.

The magnetic-shoe fixation portion 31 is an annular structure. A plurality of magnetic shoes 6 is distributed regularly on an inner side wall of the annular structure. The magnetic shoes 6 are disposed around the center of the magnetic-shoe fixation portion 31. A locating installation slot 311 is provided in the annular structure between the magnetic shoes 6. As shown in FIG. 4, the locating installation slots 311 are formed by recessing the inner side wall of the annular structure toward the outer side of the magnetic-shoe fixation portion 31, and has a length of equal to the height of the annular structure. The upper and lower ends of the locating installation slot 311 are communicated with the upper and lower end faces of the annular structure. The locating installation slot 311 in the structure described above is formed during integral molding of the rotor 3. In the mold, locating ridges are provided at positions corresponding to the locating installation slots 311 for mating therewith. The magnetic shoe 6 is disposed between every two adjacent locating ridges for the purpose of locating, thereby improving the assembly accuracy.

The magnetic-shoe fixation portion 31 is integrated with the bearing installation portion 32 through injection molding or metal die-casting. The bearing installation portion 32 is provided at only one side of the rotation plane of the magnetic-shoe fixation portion 31. In this way, accurate coaxiality is achieved between the magnetic-shoe fixation portion 31 and the bearing installation portion 32 by the mold. During installation, the bearing 8 is installed in the bearing installation portion 32, and then the rotary shaft 1 to which the stator 2 is fixed is passed through the inner annular chamber 310 of the magnetic-shoe fixation portion 31 and then through the bearing installation portion 32 and is fixed thereto. The coaxiality between the rotary shaft 1 and the stator 2 has been adjusted before assembly of the rotor 3. As such, the installation is convenient. The coaxiality between the magnetic-shoe fixation portion 31 and the bearing installation portion 32 and their respective symmetry are ensured through well-established equipment's and processes for injection molding or metal die-casting by simply adjusting the process parameters and using a mold. This leads to simple process steps, products with highly accurate sizes, and reduced costs.

The rotor 3 further comprises a connection portion 33 having one end fixed on the magnetic-shoe fixation portion 31 and the other end fixed on the bearing installation portion 32, such that the magnetic-shoe fixation portion 31 and the bearing installation portion 32 are not in direct contact. The magnetic-shoe fixation portion 31 and the bearing installation portion 32 are integrated with the connection portion 33.

The stator 2 is fixed on the rotary shaft 1. When energized, the stator 2 causes the rotor 3 to rotate about the rotary shaft 1 via the bearings in the bearing installation portion 32. The connection portion 33 allows the magnetic-shoe fixation portion 31 and the bearing installation portion 32 to be connected to each other without direct contact, thereby ensuring stable rotation of the rotor.

The connection portion 33 comprises an L-shaped stiffening rib having one end fixed on the magnetic-shoe fixation portion 31 and the other end fixed on the bearing installation portion 32.

The L-shaped stiffening rib comprises one arm parallel to the rotary shaft 1 and the other arm perpendicular to the rotary shaft 1. The end of the arm perpendicular to the rotary shaft 1 is fixed on the magnetic-shoe fixation portion 31, and the end of the arm parallel to the rotary shaft 1 is fixed on the bearing installation portion 32. The L-shaped stiffening ribs are distributed regularly on and fixed to a periphery of the magnetic-shoe fixation portion 31 so as to ensure stable connection between the magnetic-shoe fixation portion 31 and the bearing installation portion 32.

As shown in FIGS. 1 and 4, a first stiffening rib 4 is provided at the connection between the L-shaped stiffening rib and the bearing installation portion 32. One side face of two adjacent side faces of the first stiffening rib 4 is fixed on the bearing installation portion 32 and the other side face is fixed on the L-shaped stiffening rib. A second stiffening rib 5 is provided at the junction between two arms of the L-shaped stiffening rib. The two adjacent side faces of the second stiffening rib 5 are fixed on the two arms of the L-shaped stiffening rib respectively.

In general, the connection and transition position between two difference shapes is weak. In the example, the bearing installation portion 32 is provided at only one side of the rotor 3, and a plurality of L-shaped stiffening ribs are provided to connect and fix the magnetic-shoe fixation portion 31 and the bearing installation portion 32. In order to further ensure the strength required to support the rotation of the rotor 3, the first stiffening rib 4 is provided thus improving the strength of the connection between the L-shaped stiffening rib and the bearing installation portion 32, and the second stiffening rib 5 is provided thus improving the strength of the connection between the two arms of the L-shaped stiffening rib. In this way, it is ensured that the various parts of the rotor 3 have sufficient strength to sustain high-speed rotation of the rotor 3.

The magnetic-shoe fixation portion 31 comprises a plurality of blade installation portions 34 that are distributed regularly around the magnetic-shoe fixation portion 31 in a radial pattern. The magnetic-shoe fixation portion 31, the bearing installation portion 32, and the blade installation portion 34 are integrated with each other.

A blade is installed and fixed to each of the blade installation portions 34. When rotating, the rotor 3 drives the blades directly to rotate, thereby eliminating the need to provide an additional housing for installing the blades, simplifying the process of installation. In contrast to a solution in which the blades are installed via a housing and are driven into rotation by driving the housing to rotate, in the present technical solution, the blades are driven directly by the rotor 3, therefore the power from the driving device is not wasted by accessory fittings such as the housing, thereby reducing the power consumption. The magnetic-shoe fixation portion 31, the bearing installation portion 32, and the blade installation portion 34 are integrated with each other. In this way, a structure with three, four, or five blades is assembled to suit clients' individual requirements by using different molds, thereby ensuring accurate installation and operation. The rotor 3 is capable of stable rotation; the processing steps are simplified, thus greatly saving the production costs.

Besides, in the present technical solution, the blades are mounted directly on the blade installation portions 34 of the rotor 3 and are driven directly by the rotor. This results in a simple and compact structure. In order to extend the functions of the ceiling fan, a non-rotatable housing may be provided to the ceiling fan. Various devices, such as a fancy lamp body, a camera, or an essential oil diffuser, may be installed on the housing as needed by the occasion, so as to provide both the fundamental function of fanning and additional functions such as illumination, image or video capturing, and air freshening. When installed in a room, such a multifunctional ceiling fan can not only improve the style and appeal of the room, but also accommodates increasingly diversified demands on the market, and therefore is suitable for widespread application.

The blade installation portion 34 is a cavity structure in which a plurality of installation posts 341 are provided. The installation posts 341 are each provided with a thread.

The cavity structure of the blade installation portion 34 reduces the overall weight of the rotor 3 and the power consumption. The installation post 341 is provided and a blade is installed and fixed on the blade installation portion 34 by passing a fastening screw through the inner threads of the blade and the installation post 341 in sequence from the bottom up or from the top down. As such, the blade is securely fixed and the fastening screw is prevented from being disengaged from the threaded hole and causing the blade to be swung off the blade installation portion 34 during high-speed rotation of the blade.

More than one bearing is provided and stacked in the bearing installation portion 32.

The length of the bearing installation portion 32 along the axial direction of the rotary shaft 1 is increased, such that more than one bearing can be housed in the bearing installation portion 32. By providing two or more coaxially-installed bearings, the rotary shaft 1 and the rotor 3 can be securely installed to each other so as to provide the strength required by the high-speed operation of the rotor 3.

A stepped installation chamber of different inner diameters is provided in the bearing installation portion 32.

Bearings of different outer diameters are installed in the stepped installation chamber of different inner diameters, and the installation chamber comprises an annular side wall for transition between the different inner diameters to provide a force for supporting the bearing of a small outer diameter, and prevent the bearings from sliding together axially, thereby improving the assembly accuracy, and ensuring stable rotation of the rotor 3.

Figure 5:
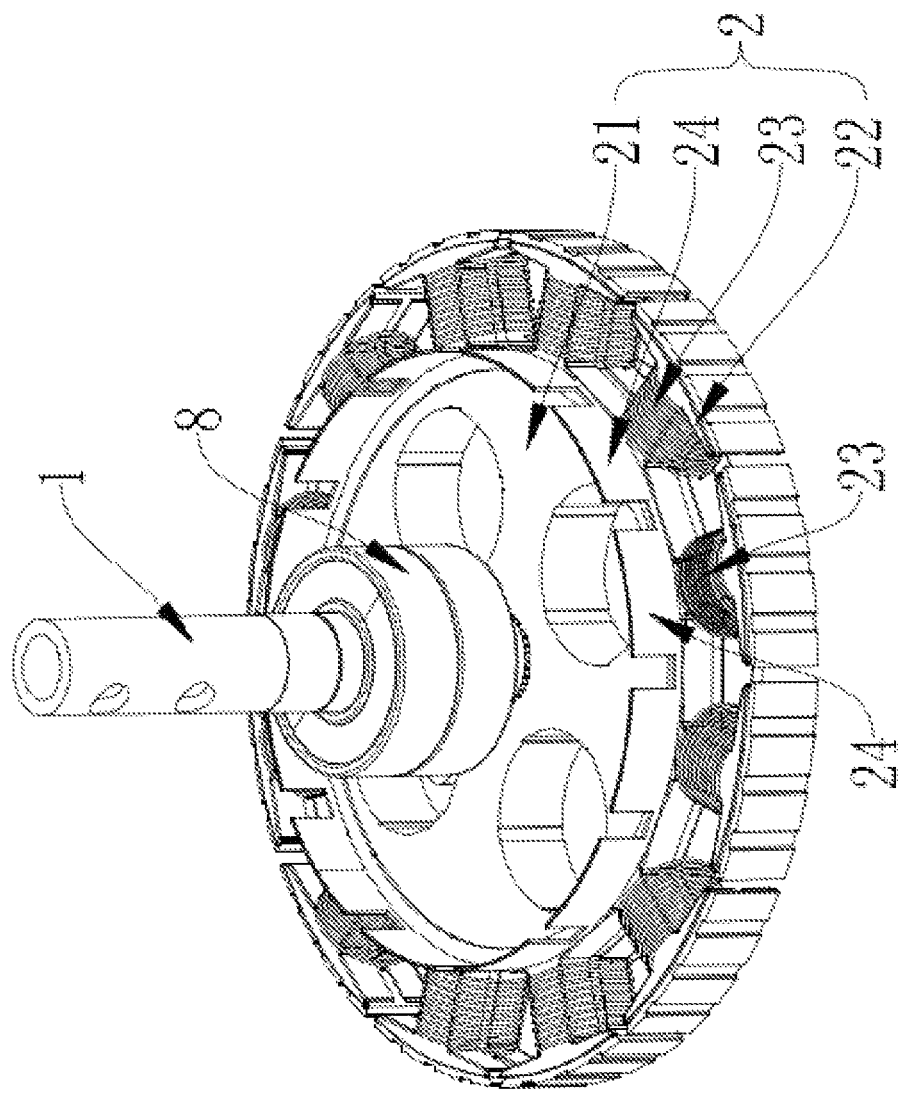
FIG. 5 is a schematic structural view of a stator of a ceiling fan according to an embodiment of the disclosure.

As shown in FIGS. 1 and 5, the stator 2 comprises a main body 21, stator teeth 22, windings 23, and a plurality of arc members 24. The rotary shaft 1 passes through and is fixed on the main body 21. The stator teeth 22 are distributed regularly at an edge of the main body 21 in a radial pattern. A wire groove is formed between adjacent stator teeth 22. The winding 23 is wrapped around the stator tooth 22.

The arc members 24 protrude outward and are fixed on the inner side of the root of the stator teeth 22 and arranged perpendicular to an end face of the main body 21. The arc members 24 are distributed regularly on the end face of the main body 21 to form a circle around the rotary shaft 1.

According to the principle of interaction between the stator and the rotor, a winding 23 needs to be wound around each stator tooth 22 respectively. A single enameled wire is first wound around a first stator tooth 22, and then a free end of the enameled wire is pulled onto and wound around a second stator tooth that is spaced apart from said first stator tooth by two stator teeth. The arc members 24 are provided for the purpose as follows. In the process of pulling the free end of the enameled wire onto the second stator tooth that is spaced apart from the first stator tooth by two stator teeth, the enameled wire runs close to the outer cambered surface of the arc member 24. In contrast to pulling the enameled wire to the intended position linearly, running the enameled wire along the outer cambered surface of the arc member 24 allows the enameled wire to become compliant with the arc shape provided between individual stator teeth 22 so that it is less prone to breakage, thereby improving the efficiency of winding.

Figure 3:
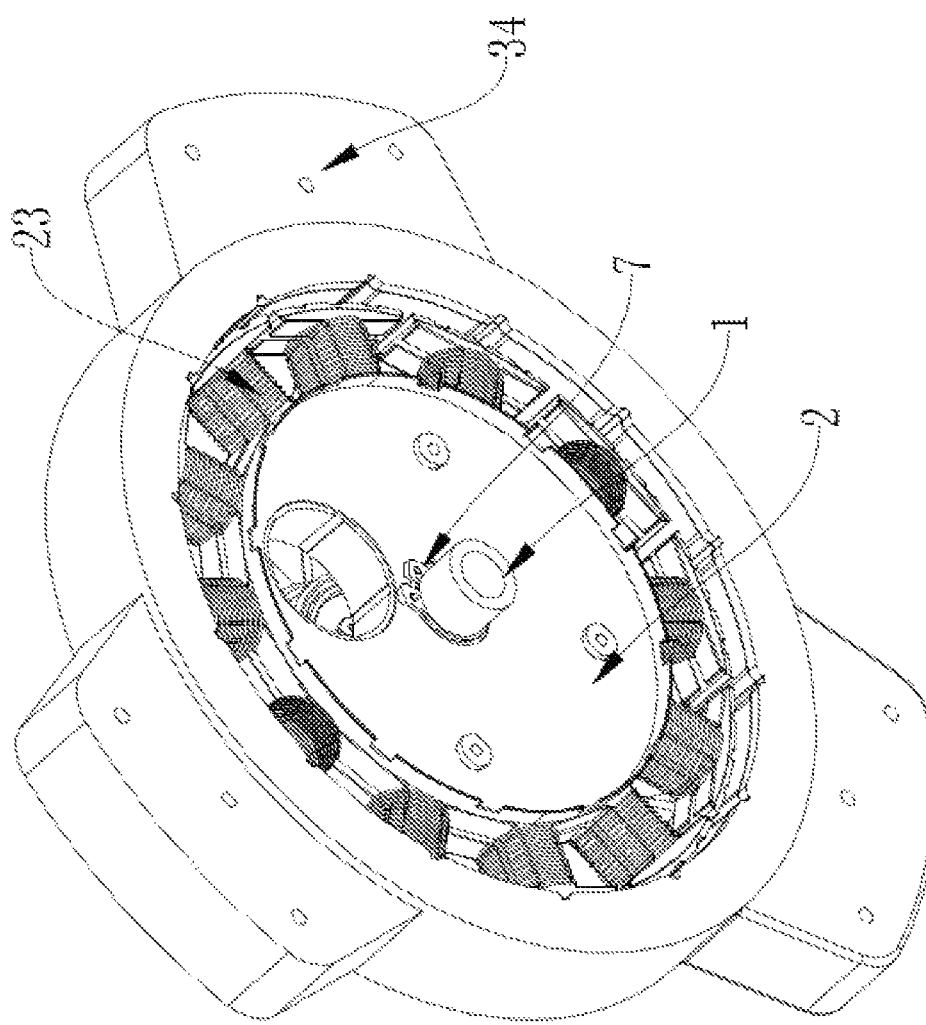
FIG. 3 is a bottom view of a ceiling fan according to an embodiment of the disclosure.

As shown in FIGS. 1, 3, and 4, an outer side wall of the rotary shaft 1 is provided with an inner groove 101 formed by recessing the inner groove 101 inward radially from the outer side wall of the rotary shaft 1. The rotary shaft 1 is inserted in the bearing installation portion 32 and the stator 2 in sequence and then a locating ring 7 is clamped in the inner groove 101 so as to fix the stator 2 and/or the bearing installation portion 32 to the rotary shaft 1.

Figure 6:
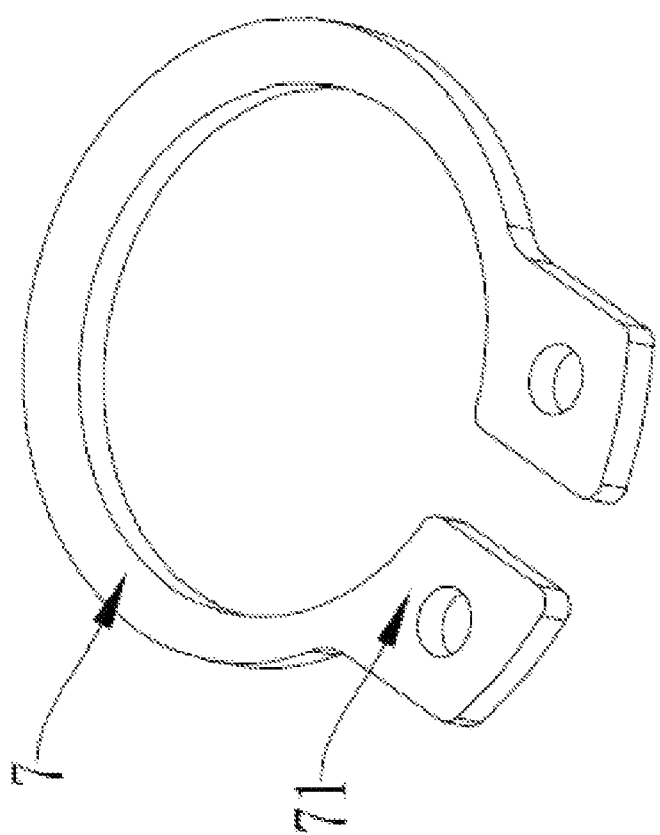
FIG. 6 is a schematic structural view of a locating ring of a ceiling fan according to an embodiment of the disclosure.

As shown in FIG. 6, the locating ring 7 is an elastic ring with openings, and the ends of the locating ring at the openings each extend outward radially to form a locating block 71. When the locating ring 7 is clamped in the inner groove 101, the outer edge of the locating ring 7 becomes larger than the outer diameter of the rotary shaft 1. The inner groove 101 is arranged based on the specific installed position of the rotary shaft 1 with respect to the stator 2 and of the rotary shaft 1 with respect to the bearing installation base 32, in such a manner that once the rotary shaft 1 is inserted in the bearing installation portion 32 and the stator 2 in sequence, one inner groove 101 is just below the end face of the stator 2, and the other inner groove 101 is just below the end face of the bearing installation portion 32, and once the two locating rings 7 are clamped in the two inner grooves 101 respectively, both the upper end face of one locating ring 7 and the locating block 71 are in contact with the lower end face of the stator 2, and both the upper end face of the other locating ring 7 and the locating block 71 are in contact with the lower end face of the bearing installation base 32. As such, the bearing installation portion 32 (and thus the rotor 3) and the stator 2 are located with respect to the rotary shaft 1 respectively such that the bearing installation portion 32 (and thus the rotor 3) and the stator 2 will not move downward, thereby allowing easy installation and clamping and accurate locating. Preferably, the inner groove 101 is provided under both the bearing installation portion 32 and the stator 2. Once the two locating rings 7 are clamped, the locating rings 7, the bearing installation portion 32, and the stator 2 act in cooperation to define the back-and-forth axial movement of the rotary shaft 1, so as to ensure secure and accurate assembly of the stator 2 and rotor 3, thereby allowing stable performance of the ceiling fan during its operation.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A ceiling fan, comprising:
a rotary shaft;
a stator; and
a rotor, the rotor comprising an inner annular chamber, a magnetic-shoe fixation portion, a connection portion, and a bearing installation portion; wherein:
the stator is housed in the inner annular chamber of the rotor;
the bearing installation portion is disposed at one side of the magnetic-shoe fixation portion;
one end of the connection portion is fixed on the magnetic-shoe fixation portion, the other end of connection portion is fixed on the bearing installation portion, and the magnetic-shoe fixation portion, the bearing installation portion are integrated with the connection portion; and
geometric centers of the rotary shaft, the stator, the magnetic-shoe fixation portion, and the bearing installation portion are located in a straight line.

2. The fan of claim 1, wherein the connection portion employs an L-shaped stiffening rib which comprises a first end fixed on the magnetic-shoe fixation portion and a second end fixed on the bearing installation portion.

3. The fan of claim 2, wherein a first stiffening rib is provided at a joint of the L-shaped stiffening rib and the bearing installation portion; the first stiffening rib comprises a first side fixed on the bearing installation portion and a second side fixed on the L-shaped stiffening rib; the L-shaped stiffening rib comprises a first leg and a second leg, a second stiffening rib is provided at a joint of the first leg and the second leg, and the second stiffening rib comprises two sides which are fixed on the first leg and the second leg of the L-shaped stiffening rib, respectively.

4. The fan of claim 1, wherein the magnetic-shoe fixation portion comprises a plurality of blade installation portions that are distributed regularly around the magnetic-shoe fixation portion in a radial pattern; and the bearing installation portion and the blade installation portion are integrated with the magnetic-shoe fixation portion.

5. The fan of claim 4, wherein the plurality of blade installation portions comprises a cavity, and a plurality of threaded installation posts are disposed in the cavity.

6. The fan of claim 1, wherein two or more bearings are disposed in the bearing installation portion.

7. The fan of claim 1, wherein the bearing installation portion comprises a stepped installation chamber for accommodating bearings with various inner diameters.

8. The fan of claim 1, wherein the stator comprises a main body, stator teeth, windings, and a plurality of arc members; the stator teeth are distributed regularly at an edge of the main body in a radial pattern; and the windings are wrapped around the stator teeth.

9. The fan of claim 8, wherein the plurality of arc members is regularly and vertically disposed on an end face of the main body.

10. The fan of claim 1, wherein an outer side wall of the rotary shaft is sunken to form an inner groove, and a locating ring is disposed in the inner groove; the locating ring cooperates with the inner groove to fix the rotary shaft in the stator and the bearing installation portion.

11. The fan of claim 10, wherein the outer side wall of the rotary shaft comprises a first inner groove and a second inner groove; the first inner groove is located below an end face of the stator, and the second inner groove is located below an end face of the bearing installation portion.

* * * * *